Patented July 27, 1943

2,325,513

UNITED STATES PATENT OFFICE 2,325,513

HALIDES OF POLYVINYL COMPOUNDS

Willy O. Herrmann, Diesenhofen, and Wolfram Haehnel, Munich, Germany; vested in the Alien Property Custodian No Drawing. Application April 23, 1940, Serial No. 331,210. In Germany May 27, 1939

5 Claims. (Cl. 260—73)

We have found, that new synthetic plastics and compounds are obtained if polyvinyl compounds, not chlorinated in the polyvinyl group, are subjected to a reaction of halogens in a substantially non-aqueous medium. Substances are thus formed which are peculiar in respect to their degree of polymerization and differ as to their properties dependent upon the polyvinyl compounds utilized. They are obtained in abundance and with a variety of properties.

The process consists of a partial or whole halogenation of the polyvinyl compounds in suitable substantially non-aqueous solvents, swelling or emulsifying agents. The quantity of the added halogen and the process of halogenation can be regulated by the usual variants of chemical processes as those of solvents, concentration, temperature, pressure, duration of reaction, exposition to light, addition of catalysts and others.

Suitable starting materials are all sorts of polyvinyl compounds not chlorinated in the polyvinyl group, like polyvinyl alcohol, polyvinyl esters, polyvinyl acetals per se or their mixtures or co-polymerization products, as for instance co-polymerization products from vinyl chloride and vinyl acetate. Polymerized vinylchloroacetates also can be used.

The substances obtained from the above named polyvinyl compounds show different properties dependent upon the selection of the starting materials, with regard to the specific kind and the degree of polymerization and corresponding to the alteration caused by the reaction. These properties extend over the whole scale of those properties of synthetic resins, necessary for producing synthetic plastics, for instance with regard to solubility, fusibility, mechanical or chemical stability and so on. Therefore their application is the same as that of known synthetic plastics, especially that of the known synthetic resins and polyvinyl compounds.

The following examples illustrate generally the preparation of this new type of substances.

Example 1

20 g. of polyvinyl alcohol, obtained by alkaline saponification of middle-polymeric polyvinyl acetate, are suspended in 530 g. of glacial acetic acid. To this suspension chlorine is added at room temperature whereupon hydrogen chloride escapes. The reaction product, a white powder, is separated from the glacial acetic acid and rewashed clean with alcohol.

The end product conforms to the analysis: 49.0% C, 6.1% H, 13.5% Cl.

It has the capability of swelling in a series of fluids like acetone, ethyl alcohol, benzene, butyl alcohol, butyl acetate, chloroform, dichrethylene, dioxane, acetic ester, acetic acid, methyl alcohol, methylacetate, methylene chloride, phenol, pyridine, tetrachloroethane, toluene, trichloroethylene, vinyl acetate, apparently without being soluble in them.

The influence of the temperature during the process is to be seen in the following comparative experiment.

Example 2

10 g. of the polyvinyl alcohol, employed in Example 1 were suspended in 190 g. of glacial acetic acid. This suspension was heated to 100° C. for 80 minutes while chlorine was added. Hydrogen chloride escaped in considerable quantities. The mixture was treated with water, the chlorination product was washed with water and dried. About 16 g. of white powder were obtained. The analysis showed: 41.9% C, 4.8% H, 28.5% Cl.

While the product, obtained according to Example 1 only swells, the reaction product made according to Example 2, possesses the capability of partial solubility in most of the above named solvents.

Example 3

20 g. of a low viscous polyvinyl acetate were dissolved in 180 g. of glacial acetic acid. The solution was heated up to 100 degrees and chlorine was conducted through the solution for 60 minutes, whereupon hydrogen chloride escaped. The clear solution of the reaction product was treated with water, whereupon a white powder was precipitated, which was carefully washed with water on the Büchner funnel. The product, dried in the vacuum at 20 degrees, showed when analysed: 50.1% C, 6.2% H, 11.2% Cl.

The substance possesses a very good and quick solubility in many solvents like acetone, formic acid, aniline, benzaldehyde, benzene, butylacetate, chloroform, dichloroethylene, dioxane, acetic ester, acetic acid, pyridine, toluene and others. On the other hand it is remarkable that the easy solubility of the starting material in alcohol is essentially reduced and in the cold practically removed. Solutions of the substance yielded good films, especially when softening agents were employed. In spite of their chlorine content these films do not turn black at 180 degrees, but only grow slightly brown. The substance can be melted. From such melted form, the substance can easily be drawn into the finest solid threads.

Example 4

Into the same starting materials as in Example 3 chlorine was added in the cold with cooling in contrast to the above heating procedure. The obtained vacuum-dry product yielded a white powder with easier solubility in most of the solvents, than the starting material. On the contrary the solubility in alcohol is much reduced, occurring only when heated. When being analysed the product showed: 51.7% C, 6.5% H, 7.3% Cl.

If working under the same conditions, for instance according to Example 3, with higher viscous polyvinyl acetates, the same phenomena are to be seen in the reaction process. The viscosity of the starting solutions decreases apparently corresponding to the action of halogen. In contrast to the starting materials the obtained products show a better solubility in most of the solvents, while the solubility in alcohols decreases with increasing chlorine content. The high molecular character of the starting materials is also to be seen in the reaction products. A high viscous starting material yields a white but more compact reaction product, which still can be melted. If employing a high molecular polyvinyl acetate which is difficultly and non-homogeneously soluble in glacial acetic acid, the solution becomes homogeneous and less viscous during the reaction, and the white reaction product, obtained in this way, is flocky, fibrous and cannot be melted.

If polyvinyl acetals, obtained by acetalisation of polyvinyl alcohol in glacial acetic acid with formaldehyde or acetaldehyde, were subjected to the same chlorine treatment in glacial acetic acid, the solutions turned clearer during the reaction process, the viscosities decreased, hydrogen chloride entered, and white or white-grey chlorinated reaction products were formed with some-what altered properties of solubility.

Example 5

In a solution of 50 g. of polyvinyl acetate in 150 g. of alcohol chlorine was conducted at a temperature between 10–20 degrees and under suitable cooling. After having added chlorine for two hours long with an increase in weight of 14.5 g. a resin was formed. When the addition of chlorine was continued during 3 hours, and an increase in weight of 79.5 g. on the whole was obtained, the clump of resin disappeared forming a light yellow solution. After having conducted chlorine for 4½ hours in succession, hydrogen chloride was formed and the solution turned dark. The increase in weight was 109.5 g. on the whole. After having added water to the solution of reaction a green resin precipitated. This resin dissolved when being boiled in water. From this aqueous solution a brown resin precipitated when hydrochloric acid was added. Boiled until free of chlorine and dried in the vacuum this resin yielded a brown powder. This powder was partially soluble in acetone and acetic ester, nearly insoluble in alcohol and butyl acetate, unsoluble in benzine, benzene, toluene, ether, dichloroethylene and trichloraethylene.

Example 6

85 g. of bromine were added to 86 g. of polyvinyl acetate in a 50% alcohol solution under cooling at a temperature of 0–10 degrees. The bromine disappeared. A further addition of bromine failed to react or reacted very slowly. The obtained bromination product possessed in fresh condition different properties than for instance after 3–4 weeks. During the storing a secondary reaction seemed to have taken place. Having added water to the fresh solution of reaction a purple red resin could be precipitated. The resin grew yellow when being heated and turned again purple red being cooled down. From the fresh reaction solution, diluted with alcohol, a white, sticky, tough resin was precipitated with water.

The solution of reaction, matured for three or four weeks, precipitated a white tough substance when water was added, whereupon some free bromine was evolved. This substance, being boiled out in water, turned in the cold to a brittle, laminated mass of white color.

The aged reaction solution could not be diluted with alcohol in contrast to the fresh solution of reaction, but precipitated therefrom a yellow resin which being boiled out in alcohol yielded a light yellow resin, hard in the cold and tough-plastic when warm. By the treatment with warm water it changed, without any special appearances of reaction, into the above described white and brittle substance.

The substance obtained from the stored reaction solution is insoluble in water, ether, alcohol, benzene, benzine, methanol, toluene and vinylacetate, hot soluble in butanol but cold nearly insoluble, soluble in glacial acetic acid, whereby the solution becomes brown and out of which the substance is precipitable by water. It is soluble in butyl acetate, acetone and acetic ester and it can be precipitated from these solutions with alcohol. If aqueous and alcoholic alkali is employed it turns to a brown, soft resin. Being boiled in diluted hydrochloric acid or sulfuric acid it does not change.

A substance obtained by alcohol precipitation, which was boiled several times in alcohol and later on in water and was dried to constancy of weight showed in the analysis: 32.8% C, 4.1% H, 51.2% Br.

Similar products can be obtained from polyvinyl acetals. For instance: if bromine is added to a solution of polyvinylformaldehydacetal in glacial acetic acid after some time a yellow substance is precipitated. This substance is soluble in hot glacial acetic acid. From such solution a yellow substance is precipitated when the solution is poured into water.

What we claim is:

1. The method of preparing halogenated polymeric vinyl compounds which comprises introducing a halogen into a medium comprising substantially anhydrous acetic acid and a polymeric vinyl compound selected from the group consisting of polyvinyl alcohol and its esters and acetals.

2. The method of preparing chlorinated polymeric vinyl compounds which comprises introducing chlorine into a medium comprising substantially anhydrous acetic acid and a polymeric vinyl compound selected from the group consisting of polyvinyl alcohol and its esters and acetals.

3. The method of preparing chlorinated polyvinyl alcohol which comprises introducing chlorine into a medium comprising substantially anhydrous acetic acid and polyvinyl alcohol.

4. The method of preparing chlorinated polyvinyl acetate which comprises introducing chlorine into a medium comprising substantially anhydrous acetic acid and polyvinyl acetate.

5. The method of preparing a chlorinated polyvinyl acetal which comprises introducing chlorine into a medium comprising substantially anhydrous acetic acid and a polyvinyl acetal.

WILLY O. HERRMANN.
WOLFRAM HAEHNEL.